June 18, 1968      TANEJI KISHIOKA      3,388,874
APPARATUS FOR CONTROLLING THE PERIPHERAL VELOCITY
OF A NEW ROLL OF PAPER Filed Jan. 3, 1966      2 Sheets-Sheet 1

United States Patent Office 3,388,874
Patented June 18, 1968

3,388,874
APPARATUS FOR CONTROLLING THE
PERIPHERAL VELOCITY OF A NEW
ROLL OF PAPER
Taneji Kishioka, Toyonaka, Osaka, Japan, assignor to
Hamada Printing Press Mfg. Co., Ltd., Osaka, Japan
Filed Jan. 3, 1966, Ser. No. 518,428
Claims priority, application Japan, Feb. 1, 1965,
40/5,653
5 Claims. (Cl. 242—58.2)

ABSTRACT OF THE DISCLOSURE

An apparatus for controlling the peripheral velocity of a new roll of paper to be preliminarily driven for automatic joining to an expiring roll of paper in a rotary printing press, comprising a drive belt which contacts the outer periphery of a new roll of paper, a preliminary drive motor connected to said drive belt, a preliminary drive main velocity detector connected to said preliminary drive motor and sensing the speed of said motor, a main velocity detector connected with the press drive and sensing the speed of the press drive, a speed sensing means contacting the outer periphery of the new roll of paper, a preliminary drive secondary velocity detector connected with said speed sensing means, a secondary velocity detector connected with said press drive, and a control circuit connected between said velocity detectors and said preliminary drive motor for driving said preliminary drive motor at a speed for increasing or reducing the peripheral velocity of the new roll of paper depending on the difference between the velocities measured by said velocity detectors.

---

The present invention relates to a method for controlling the peripheral velocity of a new roll of paper, especially of newsprint, to be preliminarily driven in an automatic roll change system for the feeding of paper to a rotary printing press.

As the feeding of newsprint to a rotary printing press progresses, the roll of newsprint is consumed and, ultimately, must be replaced by a new roll of newsprint. To effect this replacement without stopping the press or reducing the speed of printing, it has been suggested, as an ideal scheme, to impart a preliminary rotary motion to the new roll paper until its rotational velocity is synchronized with the feeding velocity of the expiring roll and, at this point, to automatically join the fresh newsprint to the old newsprint.

In accordance with the hitherto-known mode of paper joining, however, it is not possible to attain a positive and accurate speed of preliminary rotation of the new roll synchronized with the feeding velocity of the expiring roll and, accordingly, to effect joining of the paper. Thus, this disadvantage affects the printing efficiency considerably. When the roll of newsprint being fed to the rotary printing press is replaced with a new paper roll as the former is exhausted, it has been found that in order to effect the paper joining without reducing the feeding velocity of the paper roll, the optimum and positive way is to impart a preliminary rotation to the new roll until the peripheral velocity of said new roll approximates the feeding velocity of the old roll and, then, to synchronize the two velocities by detecting any error or discrepancy of an infinitesimal order between the two velocities.

It is a primary object of the present invention to provide a means by which the roll of newsprint being fed to the high-speed rotary printing press may be replaced with a new roll of newsprint without interruptions when the former roll is exhausted.

It is a further object of the present invention to preliminarily detect and control by a main velocity detector of the preliminary drive means and a main velocity detector of the roll drive means the difference between the feeding velocity of the expiring roll of paper and the peripheral velocity of the new roll of paper and to minimize the difference between said feeding velocity and peripheral velocity during an initial detecting and controlling step, and thereafter by a secondary velocity detector of the preliminary drive and the secondary velocity detector of the roll drive means to additionally detect and control smaller discrepancies which are very difficult to handle by the aforesaid initial detecting and controlling step, thereby making the peripheral velocity of the new paper roll the same as the feeding velocity of the expiring roll during the additional detecting and controlling step.

These objects are achieved by the provision of a novel velocity control system, comprising a main velocity detector in a preliminary drive having a drive belt which contacts the outer periphery of a new roll of paper from a preliminary drive motor, a main velocity detector connected with the press drive system, a secondary velocity detector means having a belt which contacts the outer periphery of a new roll of paper and a secondary velocity detector connected with said press drive system through a clutch and a stepless speed changer.

The other objects and advantages of the invention will become apparent as the following description proceeds, reference being had to the accompanying drawings, in which.

Figure 1:
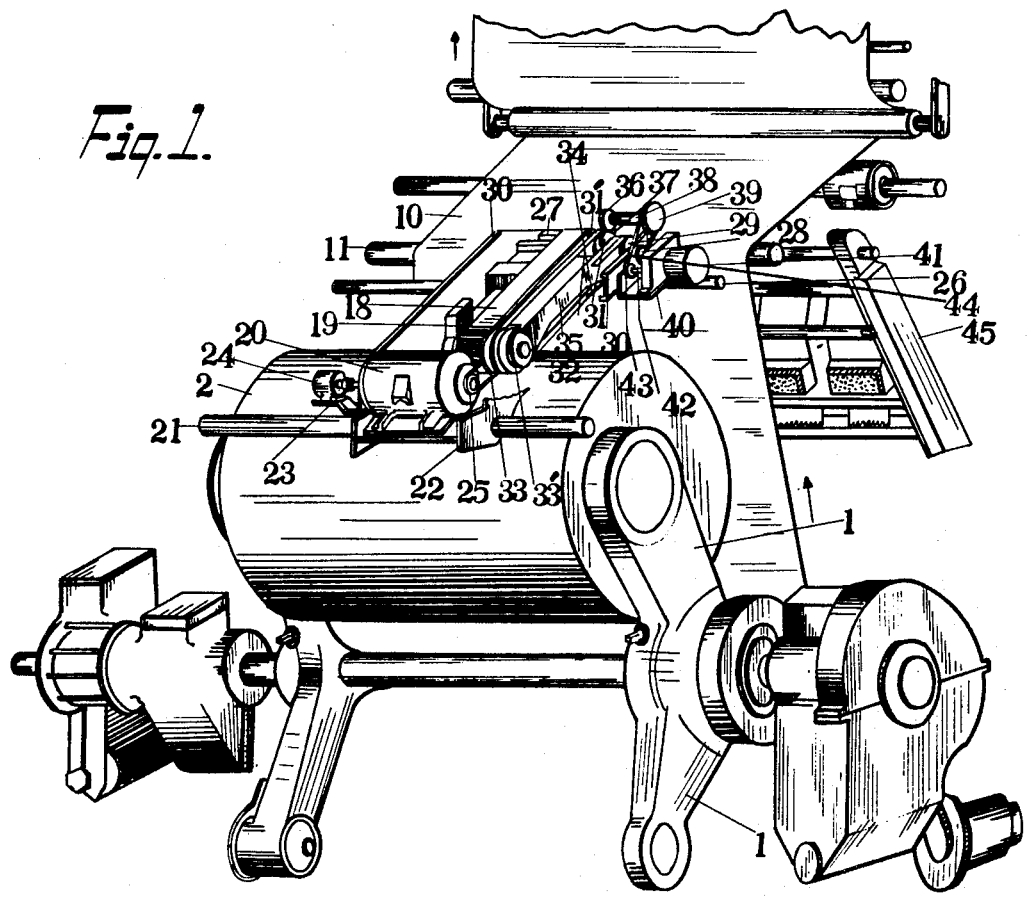
FIG. 1 is a partial perspective view of the paper feeding apparatus for a rotary newspaper printing press, embodying the principles of the invention.
Figure 2:
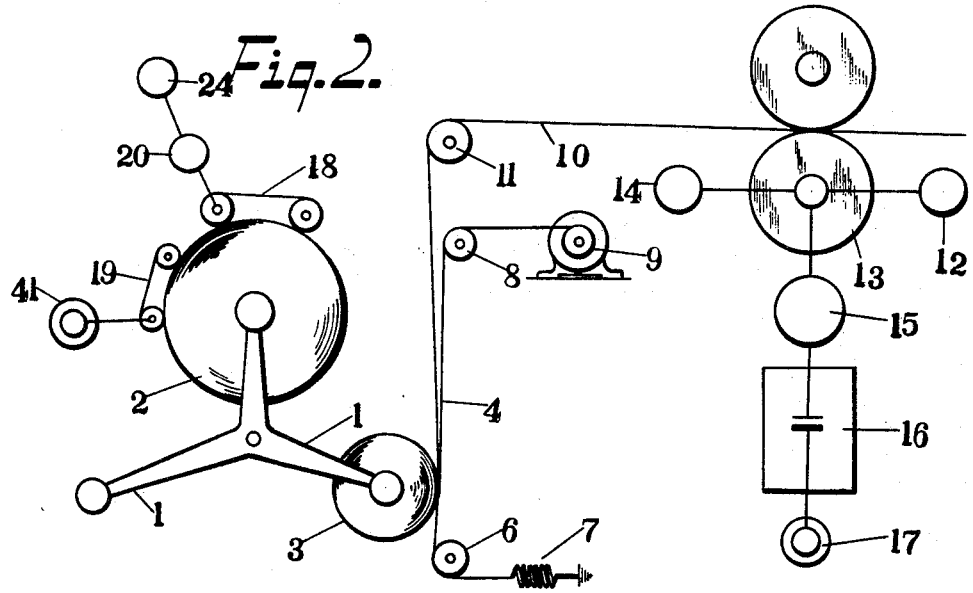
FIG. 2 is a schematic view explaining the mechanism of the present apparatus illustrated in FIG. 1.

Referring, now, to FIGS. 1 and 2, there is provided in the paper feeding zone of the newspaper printing press a pair of three-pronged arms 1 which are pivotally mounted on a shaft for a paper roll stand. Mounted on the mutually facing pair of prongs of said arms 1 is a new roll of paper 2, while the expiring roll 3 being fed to the rotary printing press is mounted on another pair of mutually facing prongs of said arms 1. A tension belt 4, located in close contact with the peripheral surface of said expiring roll 3, serves to keep constant the tension of the web of newsprint 10 being paid out of the expiring roll 3 toward the rotary printing press.

A lower guide roll 6 is provided near the lower end of said tension belt 4, around which the tension belt is guided, and the belt is attached to a spring 7 at its lower end. The upper end of said tension belt 4 is guided around an upper guide roller 8 and connected to a tension motor 9. The web of newsprint 10 paid out from the expiring roll 3 comes into contact with said tension belt 4. A main velocity detector 14 connected with a press drive system 13 driven by a drive motor 12 mounted on the printing press. The drive system, in turn, is connected with a stepless speed changer 15. A secondary velocity detector (synchro-oscillator) 17 is connected through a clutch 16 with said speed changer 15. The stepless speed changer 15 and clutch 16 can be conventional.

A preliminary drive system adapted to impart a certain peripheral velocity to the new roll 2 consists of a drive belt 18 and a preliminary drive motor, the belt 18 being in driving contact with the new roll 2 mounted on said three-pronged arms 1. The drive belt 18 is connected with a preliminary drive motor 20. A speed sensing belt 19 contacts the outer periphery of new roll 2 adjacent the drive belt 18. An H-shaped support 22 is mounted on a stationary rod 21 secured rigidly to a feeding frame, and the preliminary drive motor 20 is securely mounted on said support 22. The motor 20 has a shaft connected with a preliminary drive main velocity detector 24 through a coupling 23, while a pulley 25 is mounted on the other end of said motor shaft. A bearing support 27 is rigidly mounted on another stationary rod 26 parallel with said stationary rod 21, and a rotor shaft 28 provided with a pulley 29 is mounted on said bearing support 27. A drive belt 34 is installed between said pulley 29 and said pulley 25.

Installed between said stationary rod 26 and support 22 are frames 30. Located adjacent to said pulley 29 mounted rotatably on said rotor shaft 28, are pulleys 31 and 31', while branch arms 32 are rotor shaft 28, and pulleys 33 and 33' are mounted on said arm 32. The drive belt 18 extends around said pulleys 31 and 33, while the speed sensing belt 19 runs around said pulleys 31' and 33'.

Said drive belt 18 comes in close contact with the peripheral surface of said new paper roll 2. A drive gear 36 is in mesh with a gear 35 disposed on one side of the pulley 31'. A drive shaft 38 is rotatably mounted on bearing plates 37 extending from the frame 30, said drive gear 36 being mounted on one end of said shaft 38. A pulley 39 is mounted on the other end of said shaft 38. A seat 40 is rigidly secured to one side of the frame 30, and a preliminary drive secondary velocity detector (synchro-receiver) 41 is mounted on said seat 40. A pulley 43 is rigidly mounted on a rotatable shaft 42 for said velocity detector 41, and a belt 44 runs around said pulleys 43 and 39. The secondary velocity detector 41 is driven through said belt 44 by the traveling of said speed sensing belt 19.

The above-mentioned secondary velocity detector 17 and preliminary drive secondary velocity detector 41 are electrically connected with each other. Indicated by reference numeral 45 is a brush arm.

Figure 3:
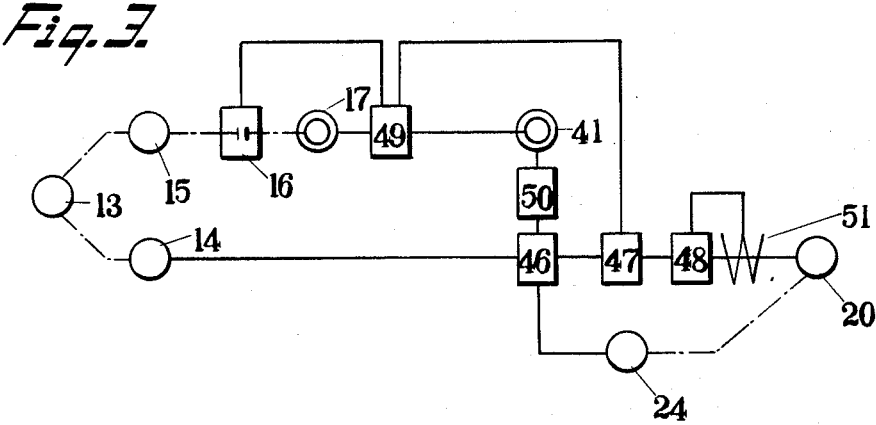
FIG. 3 is a block diagram showing the electrical circuit of the invention.
Figure 4:
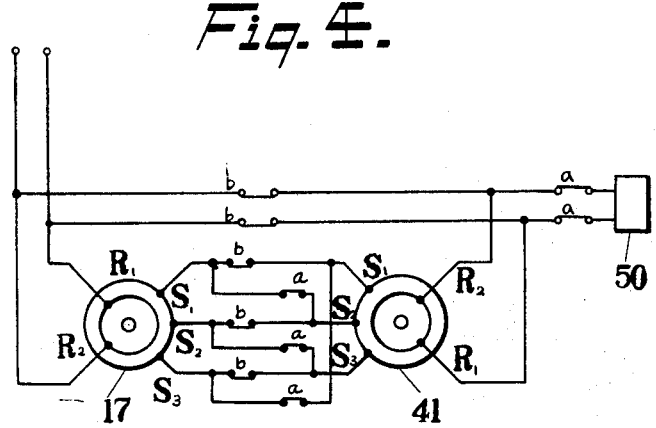
FIG. 4 is a schematic diagram illustrating the velocity detecting circuit adapted to detect the feeding velocity of the newsprint roll and the peripheral velocity of a new roll.

The velocity controlling mechanism of the invention will now be described in further detail with reference to the accompanying drawings and particularly to FIGS. 1, 2, and 3.

The velocity of paper being fed by the drive motor 12 of said rotary printing press is sensed, and translated into a velocity signal, by the press drive main velocity detector 14. This signal is fed to a velocity signal comparison-mixing circuit 46 and, then, to an amplifying circuit 47, whence it is further sent to an input regulation circuit 48, which controls the preliminary drive motor 20. The peripheral velocity of the preliminary drive motor 20 is sensed, and translated into a velocity signal, by the preliminary drive main velocity detector 24, and this is fed to said velocity signal comparison-mixing circuit 46. The stepless speed-changer 15 is connected with the press drive system 13, and the secondary velocity detector 17 is connected through the clutch 16 with said speed-changer 15. The preliminary drive secondary velocity detector 41 is connected through a change-over circuit 49 with said detector 17. Thus, from said two secondary velocity detectors 17 and 41, the velocity signals are sent to the velocity comparison - mixing circuit 46 through a rectifying circuit 50. The change-over circuit 49 and clutch 16 are actuated by said amplifying circuit 47. Indicated by reference numeral 51 is a current variation detector connected for feedback to input regulation circuit 48.

As illustrated in FIG. 1, the mechanism adapted to detect the velocity of the web of newsprint 10 paid out from the expiring roll 3 consists of the above-mentioned main velocity detector 14 and secondary velocity detector 17. The output shaft of said stepless speed-changer 15 is connected with the shaft of said secondary velocity detector (synchro-oscillator) 17 through the clutch 16. The secondary velocity detector 17 functions as a paper velocity detector to detect velocities within a few percentage points below or above the actual velocity through the stepless speed-changer 15 after the main velocity detector 14 has detected the speed generally, while the preliminary drive main velocity detector 24 is connected to the preliminary drive motor 20 in order to detect the speed of the preliminary rotation of the peripheral surface of the new paper roll 2 and feed it to the velocity signal comparison mixing circuit 46 to synchronize the velocity of said preliminary rotation with the feeding velocity of the paper. The preliminary drive velocity detector 41 is connected to the speed sensing belt 19 which is held in close contact with the peripheral surface of said new paper roll 2.

The relative velocity of feeding the newsprint from the expiring roll 3 and the peripheral velocity of the new roll imparted by the preliminary driving means is detected by a combination of two series of detectors, one series comprising said main velocity detector 14 and said preliminary drive main velocity detector 24 which detect the velocity difference between said feeding and peripheral velocities and the other series comprising said secondary velocity detector 17 and said preliminary drive secondary velocity detector 41 which detect the infinitesimal difference between said two velocities. Thus, the feeding velocity of paper to the press is closely detected and can be synchronized with the peripheral velocity of the new paper roll.

The manner in which the preliminary roll drive motor is electrically controlled will be described hereinafter with special reference to FIGS. 2 to 6.

The amount of paper in the expiring roll 3 mounted on said arm 1 diminishes as the web of newsprint is constantly fed to the printing press. When the expiring web of newsprint is finally exhausted, the web from the new paper roll 2 starts being fed smoothly to the press. In order that the paper-joining, which may be effected by pasting, for instance, may be carried out when the web of newsprint is being fed to the press at high speed, the new paper roll preliminary drive system must be brought into contact with the peripheral surface of the new paper roll by means of a certain lever mechanism adapted to lift or lower the speed sensing belt so that the preliminary drive control circuit may start functioning. Thus, the preliminary drive motor 20 stands still at first, and in this state, the velocity signal of the preliminary drive main velocity detector 24 is equal to zero. The clutch 16 also remains disengaged and the output shaft of the stepless speed-changer 15 does not actuate the secondary velocity detector 17. The synchro-oscillator which acts as the secondary velocity detector 17 is electrically connected with the synchro-receiver which acts on the preliminary drive secondary velocity detector 41. However, as diagrammatically illustrated in FIG. 4, the switches $b$ remain closed, and switches $a$ remain open. Therefore, the relation between said synchro-oscillator 17 and said synchro-receiver 41 is a torque-synchronizing relation.

Since it is not connected with the synchro-rectifying circuit 50, because the switches $a$ remain open, the velocity signal comparison-mixing circuit 46 receives only the signal from the main velocity detector 14 and the signal so received is then sent to the input regulation circuit 48 through the amplifying circuit 47. After the drive belt 18 has been moved into contact with the new paper roll and on reception of the velocity signal from the input regulation circuit 48, the preliminary drive motor 20 starts running and, as a result, the new paper roll 2 is caused to turn by said motor 20 through the drive belt 18 which is held in intimate contact with the peripheral surface of said roll 2. Because the input regulation circuit 48 receives a negative feedback signal from the current variation detector 51 which detects the amount of variation to the input current of the preliminary drive motor 20, the rotation of said preliminary drive motor 20 does not change abruptly but is gradually accelerated.

As the rotational speed of the preliminary drive motor 20 is increased, the preliminary drive main velocity detector 24 connected with said preliminary drive motor 20 senses a velocity signal and functions in a synthetically offsetting manner with respect to the main velocity detector 14 through the velocity signal comparison-mixing circuit 46, which sends the resulting differential velocity signal to the amplifying circuit 47.

The rotational velocity of said preliminary drive motor 20 is controlled by said differential velocity signal through said input regulation circuit 48, and tends to be stabilized at the velocity where the differential velocity signal is zero. However, perfect synchronization can not be expected from such a simple velocity detection and control, for the preliminary drive main velocity detector 24 is connected with the preliminary drive motor 20 and there must be a certain amount of slip between the peripheral surface of the new roll 2 and the drive belt 18 which is held in intimate contact with said peripheral surface. If the slip is reduced to zero, there still remain certain amounts of characteristic errors inherent in the mechanism of the main velocity detector itself and the non-sensitive band of the amplifying circuit 47, with the result that if a nearly perfect synchronization is attained, it will not be constantly maintained.

To eliminate the above-mentioned disadvantage, a secondary velocity detecting system, such as the secondary velocity detectors in the form of synchro-oscillator 17 and synchro-receiver 41, is required. With the clutch 16 remaining disengaged, the rotary shaft of the synchro-oscillator 17 is free to run. However, it is electrically connected with the synchro-receiver 41 so as to be in torque synchronization and the rotor shaft of the synchro-oscillator 17 receives the torque from said synchro-receiver 41, to which the former is not mechanically connected in any manner, so that the shaft thereof turns in syncronization with said synchro-receiver 41. The relative rotor position of the synchro-oscillator 17 and synchro-receiver 41 is the electrically stable position of zero phase angle before any changeover occurs.

Until the feeding velocity of the expiring roll is substantially synchronized with the peripheral velocity of the new paper roll, the control signal for the new roll peripheral velocity is obtained from the difference in signals between the main velocity detectors 14 and 24. Meanwhile, the synchro-oscillator 17 and synchro-receiver 41 are synchronized by the torque produced by the synchro-receiver 41 as the velocity speed detecting belt 19, which is independent of said new roll drive belt 18, is held against the peripheral surface of the new paper roll 2. As the velocity of the preliminary drive motor 20 increases gradually and, as a consequence, the velocity difference mentioned above diminishes, the output signal of the amplifying circuit 47 is also reduced until a predetermined value is reached. This signal is then separately detected to actuate the change-over circuit 49, whereby the switches between the synchro-oscillator 17 and synchro-receiver 41 are changed over so that the $b$ switches are open and the $a$ switches are closed and clutch 6 is engaged.

The point at which the change-over circuit 49 starts functioning is set a short period before the lowest limit of detection of the differential velocity attainable by the main velocity detectors 14 and 24 is reached. Therefore, the difference between the feeding velocity of paper to the rotary printing press and the peripheral velocity of the new paper roll is approximately equal to zero at the moment when the change-over circuit 49 is actuated. As soon as the change-over circuit 49 is thus energized, the synchro-oscillator 17 and synchro-receiver 41 function as a synchro-control transformer, instead of a torque synchronization system. And as the clutch 16 is engaged and the output shaft of the stepless speed-changer 15 is coupled with the rotor shaft of the synchro-oscillator 17, the shafts of both the oscillator and receiver are then simultaneously driven. The rotor of the synchro-oscillator 17 is given a velocity of rotation proportional to the velocity of feed from the old paper roll by way of the stepless speed-changer 15 and clutch 16 connected to the rotary press drive system 13. On the other hand, the rotor of the synchro-receiver 41 is synchronized with the peripheral velocity of the new paper roll through the speed sensing belt 19 traveling in intimate contact with the peripheral surface of the new paper roll.

Electrically speaking, between secondary terminals $R_1$ and $R_2$ of the synchro-receiver 41, there is created a voltage, $E_2$, which is determined by the rotor position $A_1$ of said synchro-oscillator 17, the rotor position $A_0$ of said synchro-receiver 41, and the angle therebetween $(Ai-Ao)$.

Figure 6:
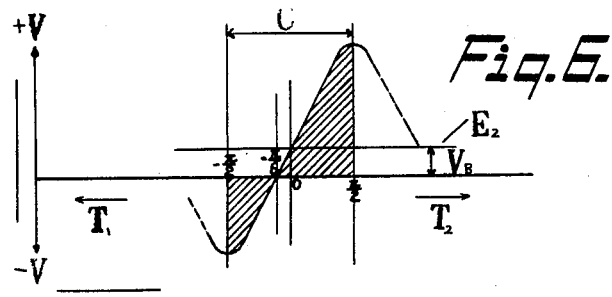
FIG. 6 is a graph explaining the phase-angle differential voltage of the synchro-oscillator and synchro-receiver.

In FIG. 6, the secondary voltage $E_2$ of the synchro-receiver is plotted along the vertical axis and the rotor phase difference between the synchro-oscillator and receiver is plotted along the horizontal axis.

In FIG. 6, $+V$ is the signal voltage for accelerating the preliminary drive motor 20 and $-V$ is the signal voltage for decelerating the motor 20, $$-\frac{\pi}{6}$$

is the position of change-over from torque synchro to control synchro, $T_1$ is gain of the rotor shaft of synchro-receiver 41 with respect to the shaft of synchro-oscillator 17 and $T_2$ is delay, C is the available range for control velocity signal, $E_1$ is the zero position of synchro voltage, $V_B$ is bias voltage, D is the control synchro zero position, O is an electrically zero position for ideal control synchronization and from $$-\frac{\pi}{2} \text{ to} +\frac{\pi}{2}$$

is the torque to be used by the preliminary drive motor 20. The voltage $E_2$ always originates at zero. This is because, before the change-over circuit 49 is actuated, the synchro-oscillator and synchro-receiver are turning at the phase angle difference of $\theta i-\theta o \neq 0$. Assuming, now, that the synchro-oscillator 17 is given a torque directly from the paper feeding system through the clutch 16, ignoring for the moment the effect of the stepless speed-changer 15, the main velocity detectors 14 and 24 ensure that the feeding velocity of paper to the printing press is in synchronization with the peripheral velocity of the new paper roll so that the synchro-oscillator 17 is at first synchronized with the synchro-receiver 41 through torque synchronization. Even at the instant after the synchro-oscillator and synchro-receiver are changed into a synchro-control transformer by actuating the change-over circuit 49, they both still have the same velocity and the phase angle difference remains zero so that no secondary voltage $E_2$ is created in the synchro-received 41. Then, where the feeding velocity of the expiring roll differs from the peripheral velocity of the new paper roll and the difference detected by said main velocity detectors 14 and 24 is small, the difference $(\theta i-\theta o)$ between the rotor position of the synchro-oscillator 17 and that of the synchro-receiver 41 is changed so that it is not equal to zero after the change-over circuit 49 is actuated.

Figure 5:
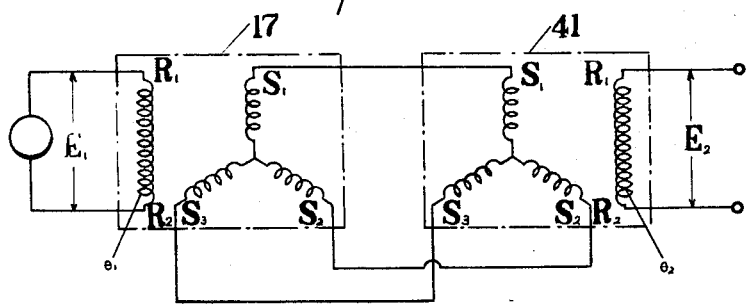
FIG. 5 is a typical circuit for the synchro-oscillator and synchro-receiver illustrated in FIG. 4.

Depending on the gain or delay of the rotor shaft of the synchro-receiver 41 with respect to that of the synchro-oscillator 17, a voltage proportional to the phase angle difference mentioned above is obtained between the secondary terminals $R_1$ and $R_2$ of the synchro-receiver 41 having the same opposite phase with respect to the input voltage $E_1$ of the synchro-oscillator 17 (see FIG. 5). As illustrated in FIG. 6, the electrically upper limit position of torque synchronization represented by $$+\frac{\pi}{2}$$

while the electrically "zero" position of control synchronization may be represented by O. In control synchronization, the circuit characteristics must be such that the circuit is neutral when the generated voltage $E_2$ is equal to "zero." This is because, in controlling the peripheral velocity of the new paper roll, it is necessary to determine whether said peripheral velocity is too high or too low, and whether the difference therebetween is large or small. For this reason, when the circuit-closing position for control synchronization by means of said synchro-oscillator and receiver is equal to "zero," the rotors of said oscillator and receiver are independently driven by their respective drive mechanisms and, therefore, when the speed of the rotor of said synchro-receiver is lower than that of the rotor of said synchro-oscillator, a voltage of positive phase is generated and conversely, a voltage of negative phase is generated when the speed of the rotor of the latter is lower than that of the rotor of the former. As the difference between the two speeds becomes larger, the absolute voltage is also increased. This invention takes advantage of this phenomenon. A positive or negative signal is produced when this differential angle voltage $E_2$ is synchro-rectified by the input voltage $E_1$. As a velocity difference signal, this signal is sent to said comparison-mixing circuit 47 to produce a control signal for the preliminary drive motor 20. Thus, even if there is some characteristic error between the synchro-receiver and oscillator, they are driven in positions where there is always a minor rotor phase angle so that the feeding velocity of the expiring roll is synchronized with the peripheral velocity of the new paper roll. It is to be understood that the available voltage $E_2$ created by the synchro-oscillator and receiver ranges from $-90°$ to $+90°$ in terms of $(\theta i - \theta o)$. As has hereinbefore been described, the stepless speed-changer 15 is connected with the press drive mechanism and the secondary velocity detector (synchro-oscillator) 17 and is connected to said speed-changer through the clutch 16. There also is provided the other secondary velocity detector (synchro-receiver) 41 connected with the speed sensing belt 19 held firmly against the peripheral surface of the new paper roll. In this arrangement, what is detected is not the velocity of paper but the amount of movement of a certain length of the paper. Thus, assuming that the length of travel of the paper 10 is 10 millimeters, the peripheral length of rotation of the new paper also is 10 millimeters, with the result that the secondary output voltage of the synchro-receiver 41 is $E_2=0$. Therefore, as soon as there is created even a very small difference between the two lengths of movement, a voltage $E_2$ is created and the control system is so actuated as to bring the voltage back to zero. Thus, the secondary control system described above detects and controls even extremely small discrepancies which cannot be detected and controlled by the primary control system so that the peripheral velocity of the new paper roll is perfectly synchronized with the feeding velocity of the expiring roll. This synchronization is performed even when the press is running at high speed and, as a result, the roll replacement can be effected smoothly without interrupting the printing operation.

At the moment when the new paper roll is bonded to the expiring roll by means of a suitable gluing mechanism in the course of feeding and is fed to the printing press, satisfactory paper-joining can not be expected even if the two strips of paper are traveling at an identical velocity, because other factors such as variations in paper tension, elongation of the paper under tension, and the like come into play. Thus, it is easier to absorb the shocks encountered at the above-mentioned transitory moment if there is a small amount of slip between the feeding velocity of the expiring roll and the peripheral velocity of the new paper roll.

In accordance with the invention, the stepless speed-changer 15 is interposed between the press drive system 13 and the clutch 16, and in order to avoid the breaking of paper of the nearly exhausted roll, said speed-changer 15 increases or decreases the slip in the velocity of the paper from the nearly exhausted roll and afterwards transmits said slip to said detector 17. Thus a synchronization is attained at a velocity differing from the feeding velocity by the amount of slip introduced by the stepless speed-changer.

Thus, according to the invention, the drive mechanism adapted to impart a preliminary peripheral rotation to a new paper roll is provided with the drive belt 18 running at right angles with the new paper roll in close contact with the latter's peripheral surface. This preliminary drive is installed between the stationary rods 21 and 26 mounted on the frame of the feeding mechanism, while the preliminary drive motor 20 is mounted on said stationary rod 21. The drive belt 18 installed between said stationary rods 21 and 26 is driven through the drive belt 34 connected with said motor, said drive belt 18 being held against the peripheral surface of the new paper roll. In this manner, the new paper roll is driven from its peripheral surface, irrespective of the diameter of the roll so that the new paper roll is driven at a given torque. It will be apparent from the above description that the paper is not only protected from undesirable effects, but an ideal cushioning effect is obtained between the drive and paper.

I claim:

1. An apparatus for controlling the peripheral velocity of a new roll of paper to be preliminarily driven for automatic joining to an expiring roll of paper in a rotary printing press, comprising a drive means which contacts the outer periphery of a new roll of paper, a preliminary drive motor connected to said drive means, a preliminary drive main velocity detector connected to said preliminary drive motor and sensing the speed of said motor, a main velocity detector connected with the press drive and sensing the speed of the press drive, a speed sensing means contacting the outer periphery of the new roll of paper, a preliminary drive secondary velocity detector connected with said speed sensing means, a secondary velocity detector connected with said press drive, and a control circuit connected between said velocity detectors and said preliminary drive motor for driving said preliminary drive motor at a speed for increasing or reducing the peripheral velocity of the new roll of paper toward the speed of the expiring roll depending on the difference between the velocities measured by said velocity detectors.

2. An apparatus as claimed in claim 1 in which said detectors produce signals according to the speed detected and said control circuit includes a comparison means for comparing signals received from said detectors, and changeover means for switching said comparison means from comparing the signals from said main velocity detectors to comparing the signals from said secondary velocity detectors.

3. An apparatus as claimed in claim 2 further including a clutch means connected between the press drive and said main velocity detector, said clutch means being connected to said changeover means of said control circuit for clutching said secondary velocity detector to said press drive when said comparison means is switched.

4. An apparatus as claimed in claim 2 in which the control circuit has a portion for comparing the signals received from said secondary velocity detectors after rough synchronization between the preliminary drive main velocity detector and the main velocity detector has been achieved, said portion comprising a synchronous oscillator and a synchronous receiver electrically coupled thereto, the synchronous oscillator having a shaft connected to said press drive and the synchronous receiver having a shaft connected to said speed detecting means, and said changeover means including changeover switches connected betwen said synchronous oscillator and synchronous receiver for changing the electrical coupling between them from a torque synchronization coupling to a synchro-control transformer coupling.

5. An apparatus as claimed in claim 2 in which said drive means is a drive belt and said speed sensing means is a speed sensing belt, said belts being mounted side by side in position for contacting the new roll of paper.

References Cited
UNITED STATES PATENTS

| | | | |
|---|---|---|---|
| 2,963,235 | 12/1960 | Pedersen et al. | 242—58.3 |
| 2,983,458 | 5/1961 | Flannery | 242—58.3 |
| 3,015,454 | 1/1962 | Flannery et al. | 242—58.2 |
| 3,298,622 | 1/1967 | Raymond et al. | 242—58.1 |

GEORGE F. MAUTZ, *Primary Examiner.*